July 1, 1958 H. D. TROTTER 2,841,446
METHODS AND APPARATUS FOR HANDLING PARTICULATE SOLIDS
Filed June 27, 1955 2 Sheets-Sheet 1
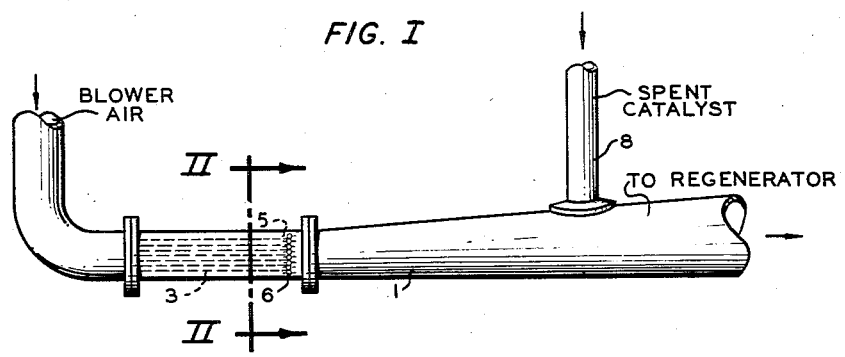
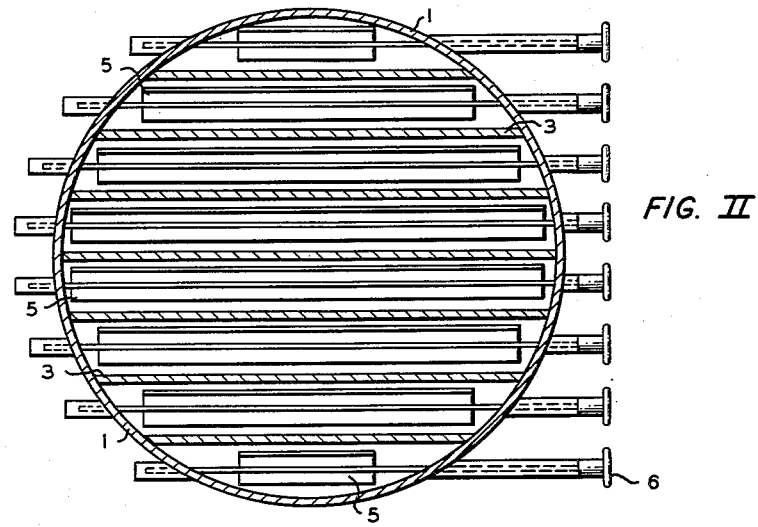
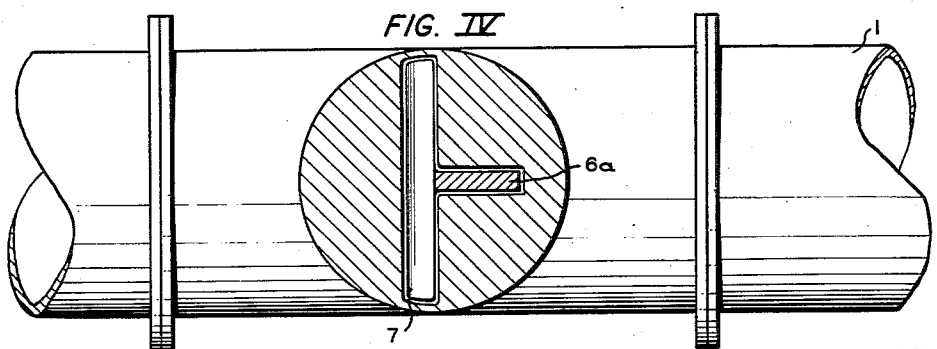
INVENTOR.
H. D. TROTTER
BY
Hudson & Young
ATTORNEYS

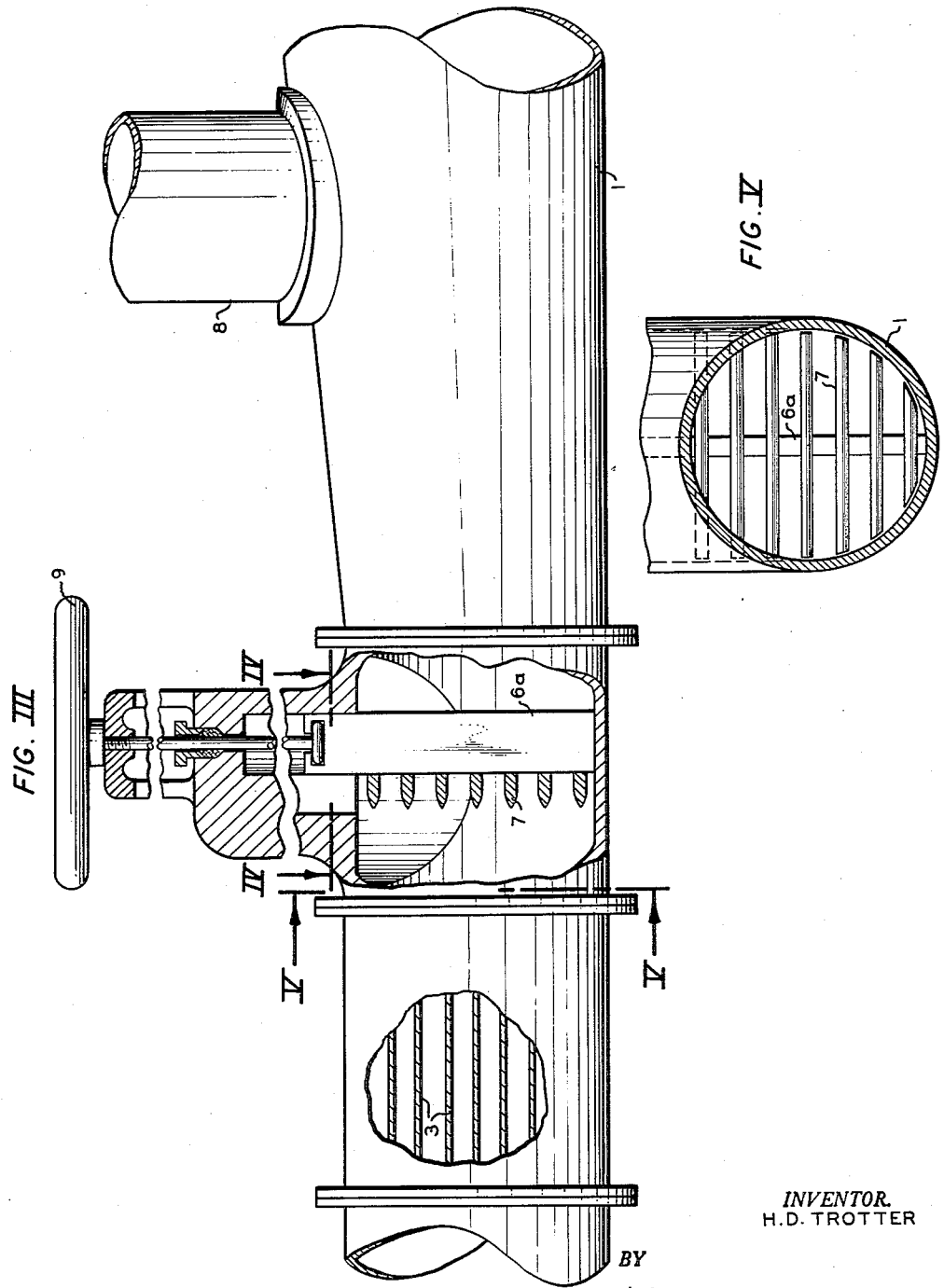

United States Patent Office 2,841,446
Patented July 1, 1958

2,841,446

METHODS AND APPARATUS FOR HANDLING PARTICULATE SOLIDS

Harry D. Trotter, Borger, Tex., assignor to Phillips Petroleum Company, a corporation of Delaware Application June 27, 1955, Serial No. 518,211

11 Claims. (Cl. 302—64)

The present invention is directed to methods and to apparatus for handling particulate solid materials. In one aspect the invention relates to conveying or transportation of particulate solids from one point to another in a confined stream as a suspension in a fluid. In another aspect the invention relates to a method and to apparatus for such transportation wherein the particulate solid is a catalytic material.

It has been found that, when a stream of particulate solids is introduced into a confined flowing stream of fluid for suspension therein and transportation of the combined stream, at some point shortly after the confluence of the two streams, a definite area or locus of maximum erosion of the conduit confining the combined streams will occur at any given conditions of quantities of flow of the two streams. Thus, the conduit must be repaired or replaced when its wall at said locus is eroded through or has become dangerously worn.

It is an object of this invention to provide methods and apparatus to prolong the useful life of a conduit employed in such service. In one aspect the invention relates to a method for prolonging the life of a conduit in such service which comprises causing the locus of maximum erosion of the conduit gradually to shift in said conduit. In another aspect this gradual shift in the locus of maximum erosion is effected by a method which comprises altering the flow pattern of the combined stream at the point of confluence. In other aspects the invention relates to apparatus for effecting these methods.

Other aspects, objects, as well as the advantages of the invention are apparent from this disclosure, the drawing and the claims.

In one particular service in which this problem is particularly troublesome, i. e., the so-called fluidized catalytic cracking of hydrocarbons, large quantities of finely divided solid catalyst materials are required to be handled. In such processes these materials are transported or conveyed from point to point in the system by injection and dispersion of the particulate solids into a flowing stream of fluid. By varying the density of the suspension of solids in the fluid material, differential pressures are obtained which aid in movement of the solid materials through the system. For example, a mass of finely divided solid material having a density of from about 25 to 50 pounds per cubic foot may be passed into a stream of fluid flowing through another conduit under a pressure of from about 10 to 25 pounds per square inch to form a suspension of catalytic material therein having a density of from about 1 to 1½ pounds per cubic foot. Under such conditions introduction of the powdered solid material can be accomplished by a gravity flow of a confined stream of the particulate solid material into a conduit through which is passed a stream of fluid material. As before noted, it has been found that at or near the confluence or juncture of the two streams in said conduit a locus of maximum erosion occurs in said conduit and further that by varying the rate of flow of either or both of the streams the point at which erosion occurs can be shifted to a new locus in the conduit. In the present invention it is sought to change the locus of maximum erosion independently of the rates of flow.

According to my invention there is provided, in a process which comprises passing a confined fluid stream from a first point to a second point and introducing a confined stream of particulate solids into confluence with said fluid stream at a point intermediate said first and second points, the step which comprises gradually altering the fluid flow pattern at the said intermediate point of confluence.

Further according to my invention there is provided, in a process which comprises passing a confined fluid stream from a first point to a second point, introducing a confined stream of particulate solids into confluence with said fluid stream at an intermediate point, in which process maximum peripheral erosive conditions are present in the combined stream at a particular locus near the point of confluence when operating at given flow rates of said respective solids and fluid streams, the step comprising gradually altering the fluid flow pattern of the said combined stream at the said point of confluence. Thus, gradual alteration of the flow pattern at this point results in a gradual progressive shift in the said locus of maximum peripheral erosive conditions. Thus, the effective life of the conduit carrying the stream of suspended solids is increased because the erosive action will, in effect, be spread out over a larger area. The gradual alteration of the flow pattern which has been mentioned encompasses both a periodic alteration and a continuous alteration. In one method of the invention this alteration is effected by gradually diverting the directional flow of at least one of the streams, solid or fluid, at a point upstream of said point of confluence. In a specific embodiment, diversion of the fluid stream is accomplished by a gradual progressive change of position of a baffle located in the fluid stream upstream of the said point of confluence. Two such specific embodiments as applied to the transfer of spent catalyst from a fluid catalytic cracking reactor by hot air to the catalyst regenerator are illustrated in the accompanying figures. These embodiments are merely illustrative of forms of methods and apparatus in which my invention can be practiced.

Figure I illustrates a "Venetian blind" type of adjustable baffle located in the hot air supply line to the main riser (to the regenerator) of a fluid catalytic cracking unit. Figure II is a cross-sectional view of Figure I taken along line II—II. Figure III illustrates another adjustable type of baffle in the same service. Figure IV is a cross-sectional view of Figure III taken along line IV—IV. Figure V is a cross-sectional view of Figure III taken along line V—V.

In Figures I and III corresponding parts have the same number. Hot air from a blower, not shown, enters conduit 1. In line 1 is illustrated a set of straightening vanes 3 located upstream of an adjustable baffle 6, being Venetian blind or shutters 5 in Figure I, and movable grid 7 in Figure III. Straightening vanes 3 serve as an aid in overcoming turbulence of the air issuing from the blower, tending to promote streamline flow; in the process and apparatus of the present invention these straightening vanes are often desirable, but are not necessary and, therefore, will not always be employed. The hot air passes through vanes 3, if present, then through adjustable baffle 6 in Figure I (6a in Figure III) to the point in conduit 1 where spent particulate cracking catalyst from a fluidized catalytic cracking reactor flows through line 8 into line 1. The combined stream then flows to the catalyst regenerator, not shown. At or beyond the point of confluence of the solids and air streams in conduit 1, there is set up a locus of maximum erosion in conduit 1. By means of the adjustable baffling arrangement 6 in Figure I (6a in Figure III) the flow pattern of the combined stream is changed at the point of confluence by gradually adjusting baffle 6. Thus, referring particularly to Figures I and II, the top shutter 5, for instance, is partially turned downward, all shutters being initially entirely open, thus somewhat diverting the directional flow of the stream of air. After an interval of operation, say, for one month, the next shutter can be partially turned down, and operation continued with two shutters turned for another month. The procedure is repeated with each successive shutter until all are partially turned down. One can then turn each shutter up again to the original position, continuing operation for one month between the adjustment of each shutter, as before.

Referring particularly to Figures III, IV and V, the baffle 6a is adjusted periodically and operation continued for an interval as described with reference to Figures I and II. One can operate for, say, one month with the grid entirely out of conduit 1, i. e., in the entirely raised position. Then one can turn handle 9 clockwise enough to lower baffle 6a into conduit 1 for a tenth of the diameter of conduit 1 for each incremental operating position until operation is with the grid 7 in the position shown in Figure III. One can then begin incremental raising of the baffle.

It will be noted that adjustment of the baffle in either embodiment illustrated will change the resistance to the flow of air. When this change will have any substantial effect on the rate of flow of air, the pressure of the air delivered from the blower is generally increased or decreased in order to maintain the air flow substantially constant.

With each incremental adjustment of the baffle 6 or 6a the directional flow of the air is diverted or deflected and the flow pattern altered, so that the flow pattern at the confluence of the two streams is altered, and the locus of maximum erosion of the conduit 1 is changed.

Other methods effective to change the locus of maximum erosive peripheral conditions in the combined stream include the use of an adjustable baffle in the confined stream of solids to divert the directional flow of solids stream before said solids enter into confluence with the fluid stream. Further, by means of a by-pass line or lines all or part of the fluid can be diverted from the main conduit, such as conduit 1 in Figure 1, upstream of the point of confluence and then led back into the main conduit at an angle further downstream but still upstream of the point of confluence. By means of suitable valves the proportion of the fluid so diverted through a single such by-pass line can be gradually changed, and thus the flow pattern at the confluence will be gradually altered, resulting in a gradual change of the locus of maximum erosion of the main conduit. Similar results can be achieved by using progressively a series of such by-pass lines whose points of re-entry into the main conduit are at different places along the main path of flow.

Reasonable variation and modification are possible within the scope of the foregoing disclosure and the appended claims to the invention, the essence of which is that in a process which comprises passing a confined fluid stream from a first point to a second point and introducing a confined stream of particulate solids into confluence with said fluid stream at a point intermediate said first and second points, the fluid flow pattern at the said intermediate point of confluence is gradually altered; and in an apparatus for conveying particulate solids by means of suspension in a flowing fluid, comprising a first conduit, a second conduit meeting said first conduit at a juncture and communicating therewith, means for causing a stream of particulate solids to be introduced into said second conduit and to flow therefrom into said first conduit at said juncture to form a combined stream, means for causing a fluid to be introduced into one end of said first conduit and for causing flow therethrough, said first conduit being subject to maximum erosion in its operation at a locus near said juncture by the erosive action of the combined stream, the improvement comprising adjustable means in combination with said first conduit effective to change maximum erosion to a different locus in said first conduit without substantially changing the quantity of said first flowing fluid or said stream of particulate solids.

I claim:
1. In a process which comprises passing a confined fluid stream from a first point to a second point and introducing a confined stream of particulate solids into confluence with said fluid stream at a point intermediate said first and second points, the step which comprises gradually altering the fluid flow pattern over a significant period of time at the said intermediate point of confluence to progressively shift the locus of peripheral erosion adjacent said intermediate point of confluence.

2. In a process which comprises passing a confined fluid stream from a first point to a second point and introducing a confined stream of particulate solids into confluence with said fluid stream at a point intermediate said first and second points, the step which comprises gradually altering the fluid flow pattern over a significant period of time at the said intermediate point of confluence while maintaining constant the respective flow rates of said fluid stream and said solids stream to progressively shift the locus of peripheral erosion adjacent said intermediate point of confluence.

3. The step of claim 2 wherein the method consists of diverting, at a point upstream from said point of confluence, the directional flow of at least one of the streams from the group consisting of said fluid stream and said solids stream.

4. The method of claim 3 wherein the directional flow of said fluid stream is diverted at a point intermediate said first point and said point of confluence.

5. The method of claim 4 wherein said fluid stream is diverted by gradually adjusting the position of baffle means in the path of said fluid stream.

6. In a process which comprises passing a confined fluid stream from a first point to a second point, introducing a confined stream of particulate solids into confluence with said fluid stream at a point intermediate said first and second points, thus producing a combined stream, in which process there is a locus of maximum peripheral erosive conditions present in said combined stream at a given locus near the point of confluence when operating at given flow rates of said respective solids and fluid streams, the step which comprises gradually and progressively changing the locus of the said maximum peripheral erosive conditions in said combined stream by gradually altering the fluid flow pattern of said combined streams over a significant period of time at the said point of confluence.

7. The step of claim 6 which comprises gradually altering said flow pattern by gradually introducing into the path of said fluid stream at a point intermediate said first point and said point of confluence means adapted to alter the flow pattern of said combined stream at the point of confluence.

8. The step of claim 6 which comprises gradually altering said flow pattern by gradually removing from the path of said fluid stream at a point intermediate said first point and said point of confluence means adapted to alter the flow pattern of said combined stream upon confluence.

9. The step of claim 6 which comprises gradually altering said flow pattern by gradually altering in sequence the position of a series of flow-deflecting baffles located in the path of said fluid stream at a point intermediate said first point and said point of confluence.

10. In a process which comprises passing a confined fluid stream from a first point to a second point, gravitating a confined stream of particulate solids into confluence with said fluid stream at a locus intermediate said first and second points, combining said streams and passing the resulting fluid stream containing suspended particulate solids to said second point, the step comprising periodically and progressively diverting the directional flow of said fluid stream at a point between said first point and said locus to progressively shift the locus of peripheral erosion adjacent said locus intermediate said first and second points.

11. In an apparatus for conveying particulate solids by means of suspension in a flowing fluid, comprising a first conduit, a second conduit meeting said first conduit at a juncture and communicating therewith, means for causing a stream of particulate solids to be introduced into said second conduit and to flow therefrom into said first conduit at said juncture to form a combined stream, means for causing a fluid to be introduced into one end of said first conduit and for causing flow therethrough, said first conduit being subject to maximum erosion in its operation at a locus near said juncture by the erosive action of the combined stream, the improvement comprising adjustable means in said first conduit effective to change maximum erosion to a different locus in said first conduit without substantially changing the quantity of said first flowing fluid or said stream of particulate solids.

References Cited in the file of this patent

UNITED STATES PATENTS

| | | |
|---|---|---|
| 1,871,773 | Bennett | Aug. 16, 1932 |
| 2,535,570 | Gordon | Dec. 26, 1950 |
| 2,550,374 | Palmer | Apr. 24, 1951 |
| 2,586,705 | Palmer | Feb. 19, 1952 |
| 2,666,269 | Parry | Jan. 19, 1954 |
| 2,695,815 | Bergstrom | Nov. 30, 1954 |